(12) United States Patent
Fullerton et al.

(10) Patent No.: US 6,383,598 B1
(45) Date of Patent: May 7, 2002

(54) PATTERNED MAGNETIC RECORDING MEDIA WITH REGIONS RENDERED NONMAGNETIC BY ION IRRADIATION

(75) Inventors: Eric Edward Fullerton, Morgan Hill; Dieter Klaus Weller, San Jose, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/602,606

(22) Filed: Jun. 21, 2000

(51) Int. Cl.$^7$ .............................. B32B 3/02; G11B 5/65
(52) U.S. Cl. ................. 428/65.7; 428/156; 428/409; 428/694 T; 428/694 TR
(58) Field of Search .................. 428/694 T, 697, 428/702, 900, 611, 636, 637, 655, 660, 668, 65.3, 65.7, 156, 409, 694 TR; 427/128, 130, 331, 552, 533, 595, 597

(56) References Cited

U.S. PATENT DOCUMENTS

| | | | |
|---|---|---|---|
| 5,587,223 A | 12/1996 | White | 428/195 |
| 5,768,075 A | 6/1998 | Bar-Gadda | 360/135 |
| 5,820,769 A | 10/1998 | Chou | 216/22 |
| 6,183,893 B1 * | 2/2001 | Futamoto et al. | 428/694 TS |

OTHER PUBLICATIONS

Maret, M., Albrecht, M., Kohler, J., Poinsot, R., Ulhaq–Bouillet, C., Tonnerre, J., Berar, J., Bucher, E., J. Magn. Magn., Mat., 218, 2000, 151.*
Le Floc'h, D., Saha–Dasgupta, T., Finel, A., Comp. Mat. Sci., 8, 1997, 192.*

T. D. Leonhardt, et al., "CRPT3 Thin Film Media for Perpendicular or Magneto–Optical Recording"—Journal of Applied Physics, vol. 85, No. 8, Apr. 15, 1999, pp. 4307–4309.
P. M. Oppeneer, et al.,"Calculated Magneto–Optical Kerr Spectra of XPt3 Compounds (X=V, Cr. Mn, Fe and Co)"—J. Phys: Condens. Matter 8 (1996) pp. 5769–5780.
C. Chappert, et al., "Planar Patterned Magnetic Media Obtained by Ion Irradiation," www.sciencemag.org—Science, vol. 280, Jun. 19, 1998, pp. 1919–1922.
B. D. Terris, et al., "Ion–Beam Patterning of Magnetic Films Using Stencil Masks," Applied Physics Letters, vol. 75, No. 3, Jul. 19, 1999, pp. 403–405.

* cited by examiner

Primary Examiner—Steven A. Resan
Assistant Examiner—Kevin M. Bernatz
(74) Attorney, Agent, or Firm—Thomas R. Berthold

(57) ABSTRACT

A patterned magnetic recording disk has a magnetic recording layer patterned into discrete magnetic and nonmagnetic regions having substantially the same chemical composition. The magnetic regions have a chemically-ordered $L1_2$ crystalline structure and the nonmagnetic regions have a chemically-disordered crystalline structure. The chemically-ordered intermetallic compound $CrPt_3$, which is ferromagnetic, is rendered paramagnetic by ion irradiation. This $CrPt_3$ material is patterned by irradiating local regions through a mask to create nonmagnetic regions. The ions pass through the openings in the mask and impact the chemically-ordered $CrPt_3$ in selected regions corresponding to the pattern of holes in the mask. The ions disrupt the ordering of the Cr and Pt atoms in the unit cell and transform the $CrPt_3$ into paramagnetic regions corresponding to the mask pattern, with the regions of the film not impacted by the ions retaining their chemically-ordered structure.

4 Claims, 4 Drawing Sheets

- ● Cr
- ○ Pt

PATTERNED MAGNETIC RECORDING MEDIA WITH REGIONS RENDERED NONMAGNETIC BY ION IRRADIATION

TECHNICAL FIELD

This invention relates generally to magnetic recording media, and more particularly to patterned magnetic recording disks with discrete magnetic regions or islands.

BACKGROUND OF THE INVENTION

Conventional magnetic recording disks in hard disk drives typically use a continuous granular magnetic film, such as a sputter-deposited hexagonal-close-packed (HCP) cobalt-platinum (CoPt) alloy, as the recording medium. Each magnetic bit in the medium is comprised of many small magnetized grains.

The challenge of producing continuous granular films as magnetic media will grow with the trend toward higher areal storage densities. Reducing the size of the magnetic bits while maintaining a satisfactory signal-to-noise ratio, for example, requires decreasing the size of the grains. Unfortunately, significantly reducing the size of weakly magnetically coupled magnetic grains will make their magnetization unstable at normal operating temperatures. To postpone the arrival of this fundamental "superparamagnetic" limit and to avert other difficulties associated with extending continuous granular media, there has been renewed interest in patterned magnetic media.

With patterned media, the continuous granular magnetic film that covers the disk substrate is replaced by an array of spatially separated discrete magnetic regions or islands, each of which serves as a single magnetic bit. The primary approach for producing patterned media has been to selectively deposit or remove magnetic material from a magnetic layer on the substrate so that magnetic regions are isolated from one another and surrounded by areas of nonmagnetic material. There are a variety of techniques for the selective deposition or removal of magnetic material from a substrate. In one technique the substrate is covered with a lithographically patterned resist material and a magnetic film is deposited to cover both the areas of resist and the areas of exposed substrate. The resist is dissolved to lift off the magnetic film that covers it, leaving an array of isolated magnetic regions. An alternative technique is to first deposit a magnetic film on the substrate and then pattern resist material on the magnetic film itself. Magnetic material from the areas not protected by the resist can then be selectively removed by well-known processes. Examples of patterned magnetic media made with these types of lithographic processes are described in U.S. Pat. Nos. 5,587,223; 5,768,075 and 5,820,769.

From a manufacturing perspective, an undesirable aspect of the process for patterning media that requires the deposition or removal of material is that it requires potentially disruptive processing with the magnetic media in place. Processes required for the effective removal of resists and for the reliable lift-off of fine metal features over large areas can damage the material left behind and therefore lower production yields. Also, these processes must leave a surface that is clean enough so that the magnetic read/write head supported on the air-bearing slider of the disk drive can fly over the disk surface at very low flying heights, typically below 30 nanometers (nm).

An ion-irradiation patterning technique that avoids the selective deposition or removal of magnetic material, but uses a special type of perpendicular magnetic recording media, is described by Chappert et al, "Planar patterned magnetic media obtained by ion irradiation", Science, Vol. 280, Jun. 19, 1998, pp. 1919–1922. In this technique Pt—Co—Pt multilayer sandwiches which exhibit perpendicular magnetocrystalline anisotropy are irradiated with ions through a lithographically patterned mask. The ions mix the Co and Pt atoms at the layer interfaces and substantially reduce the perpendicular magnetocrystalline anisotropy of the film, with the result that the regions of the disk that are not irradiated retain their perpendicular magnetic properties and serve as the magnetic bits.

Chemically-ordered alloys of FePt and CoPt formed as thin films have also been proposed for horizontal magnetic recording media. Chemically-ordered alloys of CrPt and CoPt, in their bulk form, are known as tetragonal $L1_0$-ordered phase materials (also called CuAu materials). They are known for their high magnetocrystalline anisotropy and magnetic moment, properties that are also desirable for high-density magnetic recording media. The c-axis of the $L1_0$ phase is similar to the c-axis of HCP CoPt alloys in that both are the easy axis of magnetization. An ion-irradiated patterned disk that uses a continuous magnetic film of a chemically-ordered Co (or Fe) and Pt (or Pd) alloy with a tetragonal crystalline structure is described in IBM's pending application Ser. No. 09/350,803 filed Jul. 9, 1999. The ions cause disordering in the film and produce regions in the film that are low coercivity or magnetically "soft" and have no magnetocrystalline anisotropy, so that the regions of the disk that are not irradiated retain their horizontal magnetic properties and serve as the magnetic bits.

One disadvantage of the Chappert et al. and IBM ion-irradiated patterned disks is that the regions separating the discrete magnetic regions from one another are not completely nonmagnetic, but still have some magnetic properties. Thus the magnetoresistive read head in the disk drive will detect noise and/or some type of signal from these regions.

What is needed is a patterned magnetic recording disk that has discrete magnetic regions separated by completely nonmagnetic regions so that only the magnetic regions contribute to the read signal.

SUMMARY OF THE INVENTION

The present invention is a magnetic recording disk wherein the magnetic recording layer is patterned into discrete magnetic and nonmagnetic regions having substantially the same chemical composition, but wherein the magnetic regions have a chemically-ordered $L1_2$ crystalline structure and the nonmagnetic regions have a chemically-disordered fcc crystalline structure. The invention is based on the fact that the chemically-ordered intermetallic compound $CrPt_3$, which is ferrimagnetic with a net magnetic moment, can be rendered paramagnetic by ion irradiation. The chemically-ordered $CrPt_3$ can have either perpendicular or horizontal (in-plane) magnetic anisotropy, depending on the substrate on which it is formed. With a transformation from magnetic (ferrimagnetic with a net magnetic moment) to nonmagnetic (paramagnetic with no remanent magnetic moment), this $CrPt_3$ material can be patterned by irradiating local regions through a mask to create the nonmagnetic regions. The ions pass through the openings in the mask and impact the chemically-ordered $CrPt_3$ in selected regions corresponding to the pattern of holes in the mask. The ions disrupt the ordering of the Cr and Pt atoms in the unit cell and transform the $CrPt_3$ into paramagnetic regions corresponding to the mask pattern, with the regions of the film not impacted by the ions retaining their chemically-ordered structure. The invention is also applicable to other XPt$_3$ films with the same chemically-ordered L1$_2$ crystalline structure, such as VPt$_3$ and MnPt$_3$.

For a fuller understanding of the nature and advantages of the present invention, reference should be made to the following detailed description taken together with the accompanying figures.

DETAILED DESCRIPTION OF THE INVENTION

Figure 1A:
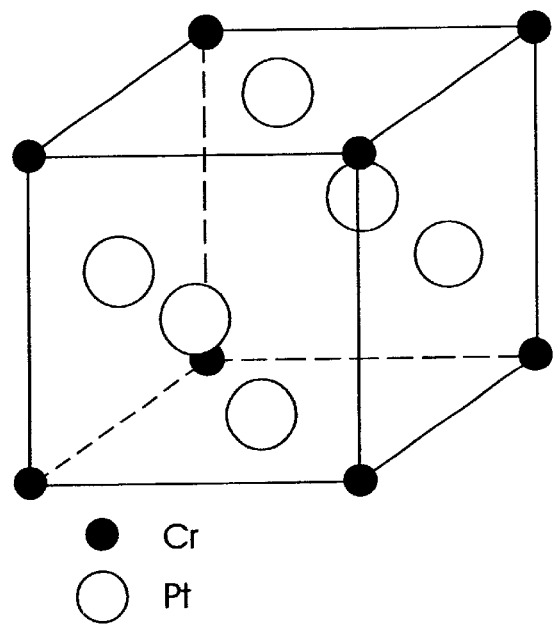
FIG. 1A is a schematic drawing of the unit cells of the chemically-ordered L1$_2$ (or AuCu$_3$) structure of CrPt$_3$.
Figure 1B:
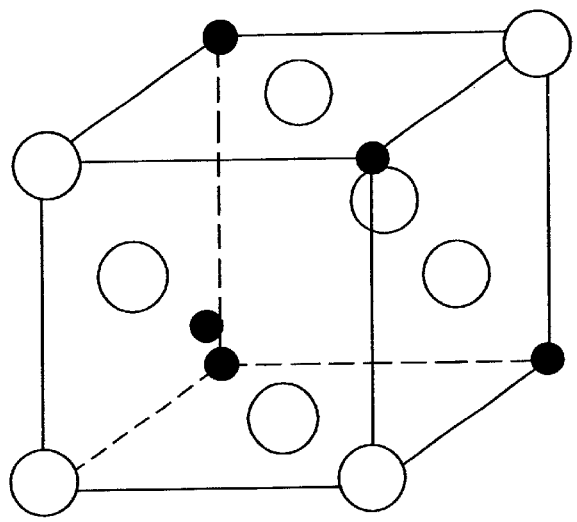
FIG. 1B is a schematic drawing of the unit cells of the disordered face centered cubic (fcc) structure of CrPt$_3$.

The intermetallic compounds XPt$_3$, such as CrPt$_3$, form an L1$_2$ structure (also known as the AuCu$_3$ structure) in the chemically-ordered phase and a randomly substituted face-centered-cubic (fcc) structure in the chemically-disordered phase, as shown in FIGS. 1A–1B. In the chemically-ordered phase (FIG. 1A), the corners of the unit cell are occupied with metallic X atoms and the face centers are occupied with the larger Pt atoms. As shown in FIG. 1A, there are 8 Cr atoms at the corners and 6 Pt atoms at the faces of a single unit cell. However, in the bulk material, each Cr corner atom is shared by 8 neighboring cell corners and each Pt face centered atom is shared by only 2 neighboring cell faces, so that the 1:3 ratio of Cr to Pt is maintained. In the chemically-disordered phase (FIG. 1B), the corner and face center positions are generally randomly occupied with Pt or X atoms, with a 75% probability that a corner or face center is occupied with a Pt atom since the ratio of Pt to X atoms is 3:1.

It is known that the chemically-ordered L1$_2$ phase of CrPt$_3$ is ferrimagnetic. The present invention is based on the discovery that the chemically-disordered phase of CrPt$_3$ created by ion irradiation of the chemically-ordered phase is paramagnetic.

Chemically-ordered CrPt$_3$ films were grown on SIN coated Si wafers with 1.5 nm Pt seed layers on the SiN The CrPt$_3$ films were grown to a thickness of 25 nm by co-sputtering of Cr and Pt in a 26:74 ratio. The substrates were mounted on a substrate plate heated to 800° C. during deposition. An alternative method for making the films is described by T. D. Leonhardt et al., "CrPt$_3$ thin film media for perpendicular or magneto-optic recording", *J. Appl. Phys.*, Vol. 85, No. 8, Apr. 15, 1999, pp. 4307–4309, wherein sputter-deposited Cr/Pt multilayers are annealed to form the chemically-ordered phase. Evidence for the existence of the chemically-ordered structure in the films was found from X-ray diffraction (XRD) measurements. The XRD scan was an H-scan with the scattering vector in the plane of the film. All the diffraction peaks can be indexed to the ordered CrPt$_3$ structure. The scan also showed a (110) diffraction peak, which is forbidden in the fcc structure, and thus confirms the formation of the chemically-ordered CrPt$_3$ structure.

In the present invention it was discovered that the CrPt$_3$ chemically-ordered L1$_2$ film can be rendered nonmagnetic (paramagnetic with no remanent magnetic moment) by ion irradiation. The CrPt3 films were patterned into magnetic/nonmagnetic regions via local ion irradiation, e.g., using 700 keV nitrogen ions (N+) at a dose of >5×10$^{16}$ ions/cm$^2$. The material undergoes a chemical order to disorder transition leading to a drastic reduction of the magnetic ordering temperature below room temperature in the irradiated areas.

Figure 2A:
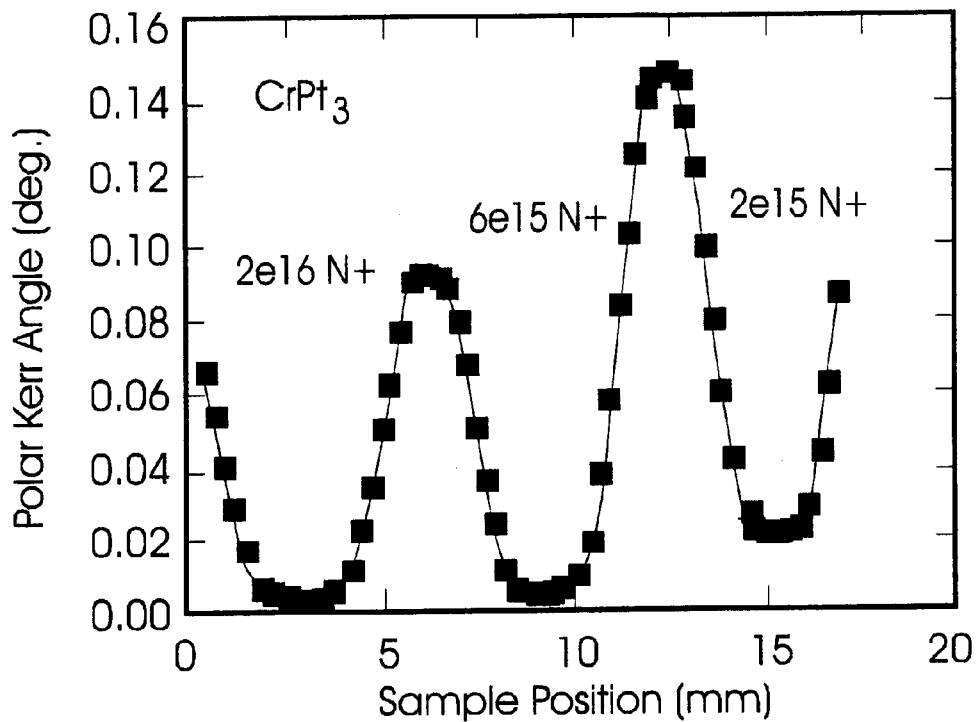
FIG. 2A shows polar Kerr angle (out-of-plane) measurements obtained by scanning a laser beam across a CrPt$_3$ sample which was exposed at three 4×4 mm$^2$ areas to different doses of N+ ions.
Figure 2B:
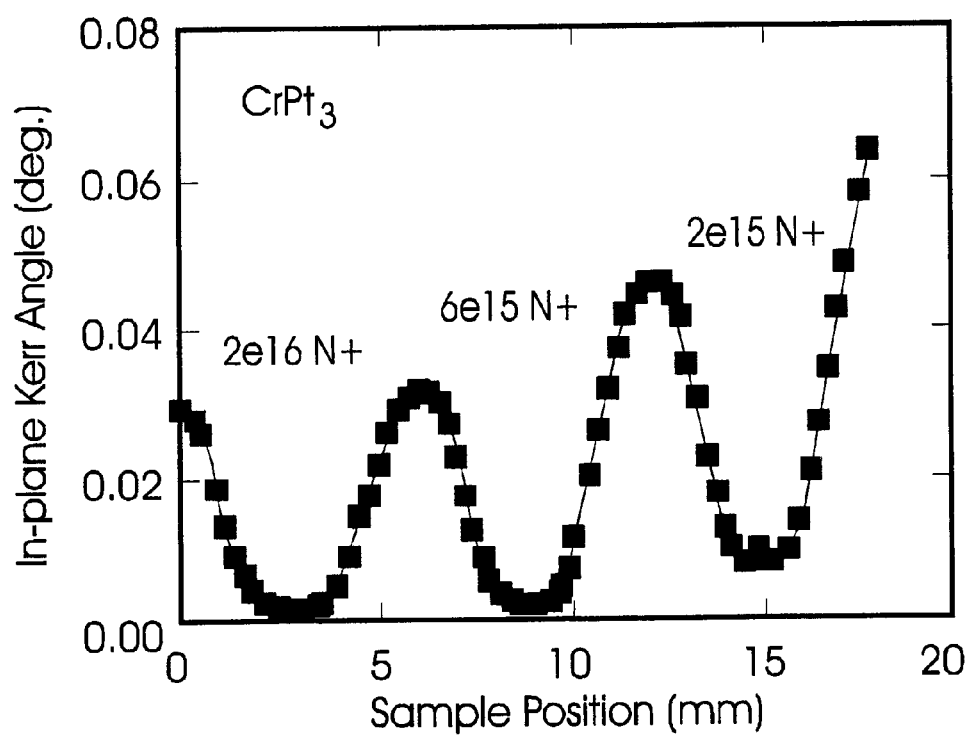
FIG. 2B shows the in-plane Kerr angle (transverse Kerr effect) measurements for the same CrPt$_3$ sample as scanned in FIG. 2B.

FIG. 2A shows polar Kerr angle measurements obtained by scanning a laser beam across a CrPt$_3$ sample which was exposed at three 4×4 mm$^2$ regions to different doses of N+ ions: 2×10$^{16}$, 6×10$^{15}$, and 2×10$^{15}$ ions/cm$^2$, respectively. FIG. 2B shows the respective scan for the in-plane Kerr angle (transverse Kerr effect). These measurements probe the out-of-plane (polar) and in-plane (transverse) components of the magnetization, respectively, and provide direct evidence that the magnetization in the ion-irradiated regions of doses larger than about 5×10$^{15}$ N+ ions/cm$^2$ has been reduced to zero. The remaining small Kerr angle is within the noise level of the measurement.

Figure 3A:
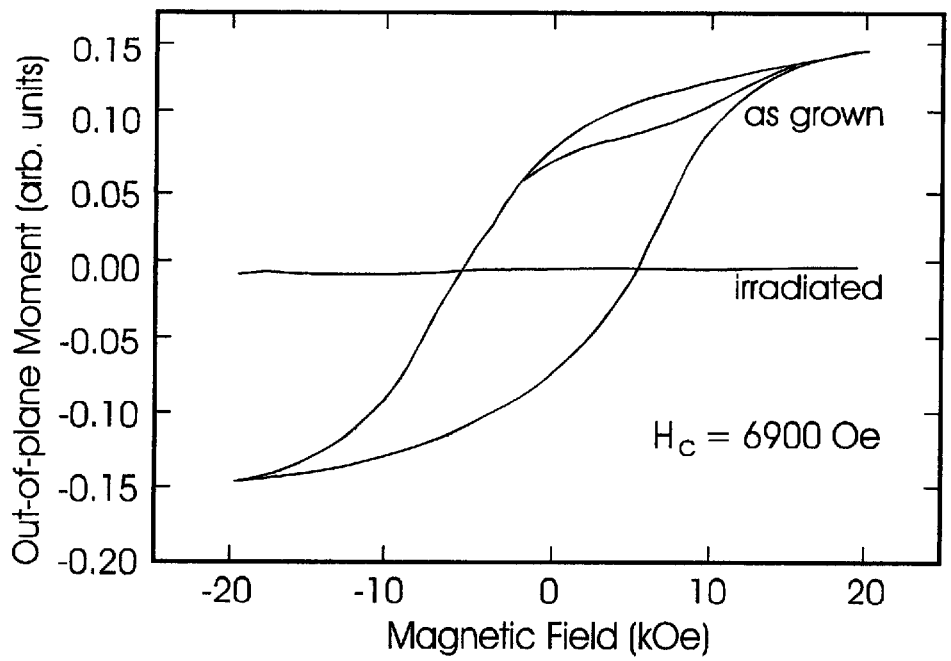
FIG. 3A is a polar Kerr hysteresis measurement of the out-of-plane magnetic moment in the as-grown and ion-irradiated (6×10$^{15}$ ions/cm$^2$) regions of the CrPt$_3$ film.

FIG. 3A is a polar Kerr hysteresis measurement of the out-of-plane magnetic moment in the as-grown and ion-irradiated (6×10$^{15}$ ions/cm$^2$) regions of the CrPt$_3$ film. The as-grown material has large perpendicular coercivity of 6900 Oe suitable for perpendicular magnetic recording media. The perpendicular magnetic remanence is about 50%. After irradiation no hysteresis within experimental error was observed, indicating the absence of ferromagnetic order. The measurements were performed at room temperature.

Figure 3B:
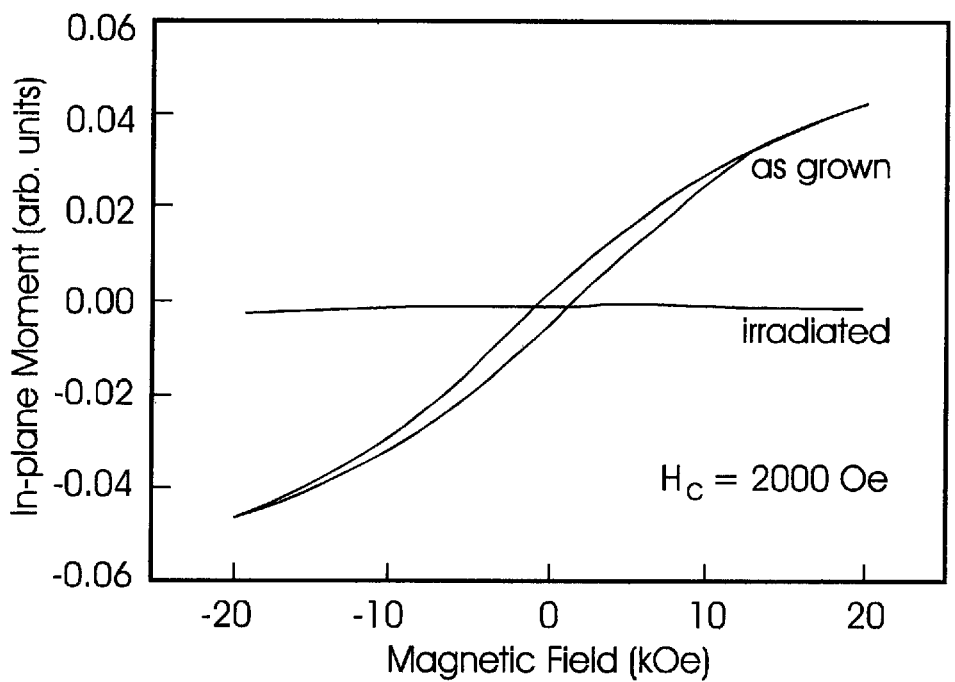
FIG. 3B is the same measurement as in FIG. 3A but with the magnetic field aligned in the plane of the CrPt$_3$ film.

FIG. 3B is the same measurement as FIG. 3A but with the magnetic field aligned in the plane of the film. In-plane magnetic remanence up to about 25% and a coercivity of 2000 Oe was observed in the non-irradiated regions of the film. After ion-irradiation, the magnetization vanishes.

For chemically-ordered CrPt$_3$ films grown on SiN$_x$, perpendicular (out-of-plane) magnetic anisotropy was observed. Films grown under similar conditions on MgO (110) substrates yielded films with horizontal (in-plane) magnetic anisotropy. Thus, the ion-irradiation patterning process of the present invention can be used to produce either perpendicular or horizontal magnetic recording media from the same material.

With a clear transformation from magnetic to nonmagnetic as a result of the ion irradiation, the CrPt$_3$ material is well suited for patterning by irradiating local regions to create nonmagnetic regions, as required to produce high density patterned magnetic recording media. In the preferred patterning method, a stencil mask is irradiated with nitrogen ions (N+) at 700 keV and the ions are selectively transmitted through the mask. The ions pass through the openings in the mask and impact the ordered CrPt$_3$ in selected regions corresponding to the pattern of holes in the mask. The ions disrupt the ordering of the Cr and Pt atoms in the unit cell and transform the CrPt$_3$ into nonmagnetic regions corresponding to the mask pattern, with the regions of the film not impacted by the ions retaining their chemically-ordered structure.

Figure 4:
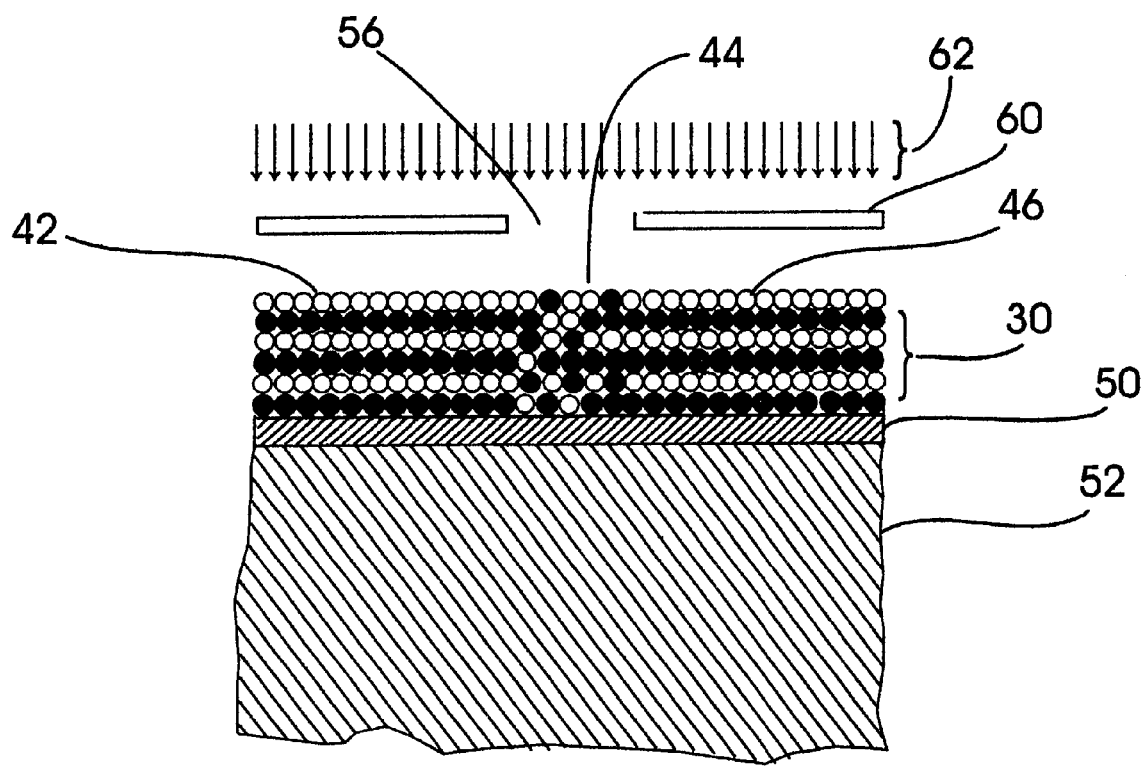
FIG. 4 is a schematic illustration of a discrete chemically-disordered nonmagnetic CrPt$_3$ region separated by chemically-ordered magnetic CrPt$_3$ regions, the nonmagnetic region being formed by ion irradiation through a non-contact stencil mask.

FIG. 4 illustrates the process schematically, wherein nonmagnetic 44 and magnetic 42, 46 regions of the film 30 are illustrated. The CrPt$_3$ film 30 is formed on a Pt seed layer 50 on SiN$_x$/Si substrate 52. The film 30 remains chemically-ordered in the L1$_2$ phase and thus ferromagnetic in the regions 42, 46 that are not aligned with a hole in the silicon stencil mask 60. In the region 44 of film 30 that is aligned with a hole 56 in mask 60, disordering has occurred, and region 44 is now nonmagnetic. The irradiated ions have disrupted the L1$_2$ chemical ordering so that the crystalline structure is now fcc, with the Cr and Pt atoms randomly distributed at the corners and face centers of the fcc unit cell. (See FIGS. 1A–1B). The film 30 after patterning has the same chemical composition (CrPt$_3$) in both the magnetic and nonmagnetic regions, with the only structural difference in the two types of regions being the crystallographic unit cells.

The stencil mask 60 is a non-contact mask that comprises a wafer, such as silicon, with holes etched through it. The ions, depicted by arrows 62, are transmitted through the holes in the wafer. The silicon stencil mask was fabricated from a commercial silicon-on-insulator (SOI) wafer with a 10 μm-thick top side silicon layer, 0.5 μm of SOI oxide, and a 500 μm-thick silicon carrier substrate. The stencil holes were first patterned by optical lithography and then transferred into the 10 μm-thick Si layer by SF$_6$-based, high aspect ratio reactive ion etching (RIE) with the SOI oxide serving as a reliable etch stop. Windows were then etched from the back side through the carrier substrate, using a similar RIE process, and the remaining SOI oxide was removed with a wet HF etch. The resulting silicon membrane is approximately 10 μm thick and covers an area of 1×1 mm. The holes in the membrane are nominally 1 μm in diameter, although somewhat irregular in shape, and are replicated throughout its area with a regular spacing of 1 to 10 μm. In making the patterned media, two such stencil masks can be aligned with their holes overlapping to create holes with effective diameters in the range of 100 nm. However, it is possible to fabricate a single stencil mask in this manner, with much smaller holes in the sub-100 nm range, to produce patterned media with the desired areal density. A detailed description of the use of stencil masks for ion-beam patterning is described by B. D. Terris et al., "Ion-beam patterning of magnetic films using stencil masks", *Appl. Phys. Lett.*, Vol. 75, No. 3, Jul. 19, 1999, which is incorporated herein by reference. In the preferred embodiment the mask has holes formed in a pattern to form a magnetic recording disk with concentric circular tracks, with each track having discrete magnetic regions spaced along it to serve as the individually recordable magnetic bits.

If has been determined experimentally that a dose of at least 5×10$^{15}$ ions/cm$^2$ of N+ ions at 700 keV is sufficient to convert the CrPt$_3$ to the chemically-disordered paramagnetic phase. While nitrogen ions were used, other ion species that may be used include ions of He, Ar, Ne, Kr and Xe. The voltage and dosage of the ion irradiation required to achieve the desired disruption of the chemically-ordered CrPt$_3$ can be determined experimentally. In the present invention, no implantation of ions and/or change in the chemical composition is needed. Instead, only moderate energy transfer of the presently used 700 keV N+ ions to the chemically-ordered film leads to random local atomic displacements causing chemical disorder within the unit cell. This in turn renders the material paramagnetic with complete loss of the remanent magnetization.

The preferred method for patterning the media with ion irradiation is by a non-contact mask, such as the silicon stencil mask described above. However, it is also possible to use conventional lithography, where a photoresist is formed on the AF-coupled layer and then patterned to expose openings aligned with portions of the CrPt$_3$ layer intended to become the nonmagnetic bit regions that are separated or isolated from the magnetic regions.

If it is desired to increase the coercivity of the magnetic regions in the patterned media, the 3:1 ratio of Pt to Cr can be slightly altered by increasing the amount of Cr or by adding a third element, such as small amounts of Fe, Co and/or Ni, during the sputter deposition of the CrPt$_3$ film. For example, it is known from phase diagrams that a Cr(45 to 15 atomic %)-Pt(55 to 85 atomic %) film has a L1$_2$ crystalline structure. Thus, such a slightly modified CrPt$_3$ film would still have a substantially L1$_2$ chemical ordering and would be magnetic before ion-irradiation.

The magnetic properties of chemically-ordered CrPt$_3$ with the L1$_2$ structure also exist to different degrees in VPt$_3$ and MnPt$_3$, as suggested by the experimental data reported by P. M. Oppeneer et al., "Calculated magneto-optical Kerr spectra of XPt$_3$ compounds (X=V, Cr, Mn, Fe and Co)", *J. Phys.: Condensed Matter* 8 (1996) 5769–5780. Thus the present invention is believed applicable to patterned magnetic recording media with these materials as well.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A patterned magnetic recording disk comprising:
   a disk substrate; and
   a film consisting essentially of the intermetallic compound CrPt$_3$ formed on the substrate and patterned into discrete magnetic and nonmagnetic regions, the magnetic regions having a substantially chemically-ordered L1$_2$ crystalline structure and the nonmagnetic regions having a chemically-disordered face-centered-cubic crystalline structure.

2. The disk of claim 1 wherein the Cr is present in the film in an amount of between 15 and 45 atomic percent.

3. The disk of claim 1 wherein the film further includes one or more of Fe, Co and Ni.

4. The disk of claim 1 wherein the magnetic regions of the CrPt$_3$ film have perpendicular magnetic anisotropy.

* * * * *